United States Patent [19]

Sugie et al.

[11] Patent Number: 4,484,309

[45] Date of Patent: Nov. 20, 1984

[54] MAGNETIC BUBBLE MEMORY DEVICE

[75] Inventors: Mamoru Sugie; Takashi Toyooka, both of Sayama; Hirokazu Aoki, Hachioji; Kazuya Kamiyama, Tokyo, all of Japan

[73] Assignee: Hitachi, Ltd., Tokyo, Japan

[21] Appl. No.: 409,557

[22] Filed: Aug. 19, 1982

[30] Foreign Application Priority Data

Aug. 19, 1981 [JP] Japan ............................... 56-128759

[51] Int. Cl.³ ............................................. G11C 8/00
[52] U.S. Cl. ..................................................... 365/1
[58] Field of Search ........................... 365/1, 189, 230

Primary Examiner—James W. Moffitt
Attorney, Agent, or Firm—Antonelli, Terry & Wands

[57] ABSTRACT

A magnetic bubble memory device is provided with a plurality of memory modules each having at least one magnetic bubble chip. Each module generates a clock for determining the timing to drive the magnetic bubble chip and controls the operation of the magnetic bubble chip. The addresses of a main memory are cyclically allocated to the memory modules in a given unit, so that data transmission can be performed between the memory modules operated asynchronously with each other and the main memory allocated thereto.

10 Claims, 5 Drawing Figures

FIG. 2(a)

| MAIN MEMORY ADDRESS | MODULE |
|---|---|
| h | 9-1 |
| h+1 | 9-2 |
| h+2 | 9-3 |
| h+3 | 9-4 |
| ⋮ | ⋮ |
| h+4n | 9-1 |
| h+1+4n | 9-2 |
| ⋮ | ⋮ |

FIG. 2(b)

| MAIN MEMORY ADDRESS | MODULE |
|---|---|
| h~h-1+P | 9-1 |
| h+P~h-1+2P | 9-2 |
| h+2P~h-1+3P | 9-3 |
| h+3P~h-1+4P | 9-4 |
| ⋮ | ⋮ |
| h+4nP~h-1+(4n+1)P | 9-1 |
| h+(4n+1)P~h-1+(4n+2)P | 9-2 |
| ⋮ | ⋮ |

MAGNETIC BUBBLE MEMORY DEVICE

BACKGROUND OF THE INVENTION

1. Field of the Invention

The present invention relates to a magnetic bubble memory device adapted to operate a plurality of magnetic bubble memory chips in parallel.

2. Description of the Prior Art

As compact and high-density nonvolatile memory devices with high reliability, magnetic bubble memory devices have been applied to various electronic apparatus.

Because such magnetic bubble memory devices, which are serial type memory devices, perform writing-in and reading-out of data by transferring magnetic bubbles, their data transmission speeds depend on the transfer speed of the magnetic bubbles. Accordingly, the simplest way to increase the data transmission speed is to increase the driving speed of magnetic bubbles, i.e., to increase the rotation magnetic field frequency.

It is, however, difficult to obtain a high driving speed above 500 kHz, because an increase in the driving frequency is inevitably accompanied by an increase in the loss in the coil by which the rotation magnetic field is produced. Accordingly, such a method for increasing the data transmission speed of a magnetic bubble memory device as a memory system has been practiced by employing a plurality of magnetic bubble chips and operating them in parallel.

In such a conventional magnetic bubble memory device, a plurality of magnetic bubble chips are provided with a controller, a clock generator and a timing generator employed in common so as to be simultaneously driven by means of the same clock.

Such a conventional device, however, requires a custom-designed mounting board for each application system in order to cope with the demand for various data transmission speeds and data formats of respective application systems; accordingly, the device has poor extensibility and brings about a rise in cost.

SUMMARY OF THE INVENTION

It is, therefore, an object of the present invention to provide a magnetic bubble memory device having a data transmission speed which meets the request of each individual application system, thereby improving its extensibility.

To this end, according to the present invention, there is provided a magnetic bubble memory device wherein a plurality of magnetic bubble memory modules, each including at least one bubble chip, are provided and are adapted to asynchronously operate in response to clock signals different from each other so as to perform data transmission with a main memory allocated to the respective modules.

BRIEF DESCRIPTION OF THE DRAWINGS

FIGS. 2(a) and 2(b) illustrate examples of the allocation method of a main memory used in the preferred embodiment of the present invention;

DESCRIPTION OF THE PREFERRED EMBODIMENT

A preferred embodiment of the present invention will be described hereinunder in greater detail with reference to the accompanying drawings.

Figure 1:
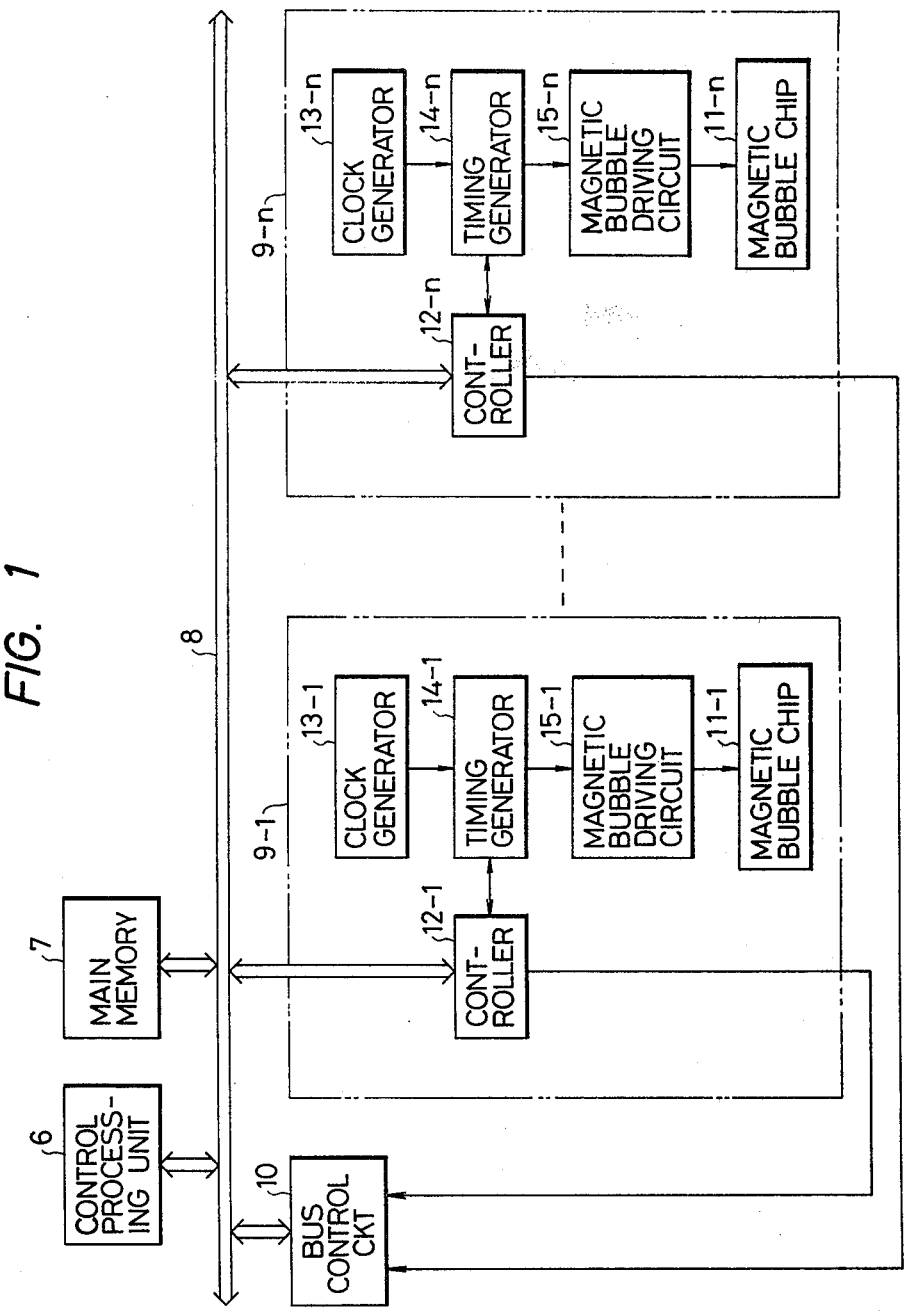
FIG. 1 illustrates the constitution of a preferred embodiment of a magnetic bubble memory device according to the present invention.

FIG. 1 illustrates an example of the general arrangement of the magnetic bubble memory device according to the present invention.

In the Figure, reference numerals 9-1 through 9-n represent a plurality of magnetic bubble memory modules containing respective magnetic bubble chips, controllers 12-1 . . . 12-n clock generators 13-1 . . . 13-n, timing generators 14-1 . . . 14-n, and bubble driving circuits 15-1 . . . 15-n. Reference numeral 6 designates a central processing unit, reference numeral 7 designates a main memory, and reference numeral 8 designates a data bus. Moreover, a bus control circuit 10 controls the data transmission between the main memory 7 and the respective magnetic bubble memory modules 9-1 through 9-n.

In each memory module 9-i, based on the clocks from the clock generator 13-i, various timing signals are generated in the timing generator 14-i and fed to the magnetic bubble driving circuit 15-i to drive the corresponding magnetic bubble chip 11-i. On the other hand, the controller 12-i controls a rotating magnetic field and the operation of each of the gates on the magnetic bubble chip 11-i as well as coverting the serial data for each magnetic bubble chip 11-i into a data format for the bus system of the central processing unit 6.

As shown in FIG. 1, a plurality of magnetic bubble memory modules 9-1 through 9-n are connected to the data bus 8 connecting the central processing unit 6 and the main memory 7 together, while the bus control circuit 10 is connected to the bus 8 as well as to each of the magnetic bubble memory modules 9-1 through 9-n.

In addition, each magnetic bubble memory module 9-i has a clock generator 13-i and timing generator 14-i and operates them asynchronously with each other. Moreover, each of the memory modules 9-i is provided with a controller 12-i so as to be controlled independently of each other. In other words, by incorporating the controller 12-i and the clock generator 13-i, each memory module constitutes a complete memory by itself.

The bus control circuit 10, which controls DMA (direct memory access) data transmission between the main memory 7 and the memory modules 9-1 through 9-n operated asynchronously with each other, receives a data transmission request from each of the memory modules 9-1 through 9-n and grants the bus to the memory module in question when a data transmission condition on the bus is satisfied, thereby allowing transmission of data between the main memory and the module. Because the memory modules 9-1 through 9-n are operated asynchronously relative to each other, it is necessary to allocate access to the main memory 7 correspongingly to the memory modules 9-1 through 9-n respectively, in order to clarify the correspondence between the memory modules and the data to be written-in and read-out from the memory modules 9-1 thru 9-n. Examples of the allocation method of the main memory therefor will be described hereinunder with reference to FIGS. 2(a) and 2(b).

Assuming that the number of memory modules 9-1 through 9-n is four and the top address in the main memory 7 to perform data transmission is h, as shown in FIG. 2(a), addresses h, h+4, h+8, ... and h+4n in the main memory 7 are allocated to the first memory module 9-1, addresses h+1, h+5, ... and h+1+4n are allocated to the second memory module 9-2, addresses h+2, h+6, ... h+2+4n are allocated to the third memory module 9-3, and addresses h+3, h+7, ... h+3+4n are allocated to the fourth memory module 9-4, respectively, to thereby allocate access to the main memory for the respective memory modules word by word cyclically and successively.

The above-mentioned allocation method is, however, not exclusive and another allocation method may be employed. In such a case, as shown in FIG. 2(b), assuming that the block capacitance of each memory module is p, addresses h through h−1+p in the main memory are allocated to the first memory module, addresses h+p through h−1+2p are allocated to the second memory module, addresses h+2p through h−1+3p are allocated to the third memory module, and addresses h+3p through h−1+4p are allocated to the fourth memory module, respectively, to thereby allocate access to the main memory for the respective memory modules block-by-block cyclically.

The bus control circuit 10 performs transmission of data between the main memory thus allocated and each memory module. Because the memory modules are operated asynchronously with respect to each other, as mentioned above, data transmission is not performed in the order of addresses in the main mamory 7 but, upon completion of the operations of all the memory modules, all data has been transmitted, with the above-mentioned correspondence satisfied. Therefore, it is possible to obtain a data transmission speed equal to the case of four magnetic bubble chips synchronously operated in parallel.

As is apparent from the above-mentioned preferred embodiment, according to the present invention, incorporating the controller and the clock generator, each individual memory module constitutes a complete memory by itself, and a desired number of such complete mass-production type memory modules are connected to the data bus according to need and operated in parallel by means of the bus control circuit in order to increase the data transmission speed. Therefore, it is unnecessary to custom design the mounting board for each application system, so that cost can be reduced correspondingly. Described with reference to FIG. 1 is the case where each of the memory modules 9-1 through 9-n has one memory chip. That is, however, not exclusive and memory modules each having a plurality of memory chips may be similarly employed.

As each of the memory modules 9-1 through 9-n thus operated asynchronously with each other, for example, a general-purpose 1Mb bubble memory board BEL0810 can be used.

Figure 3:
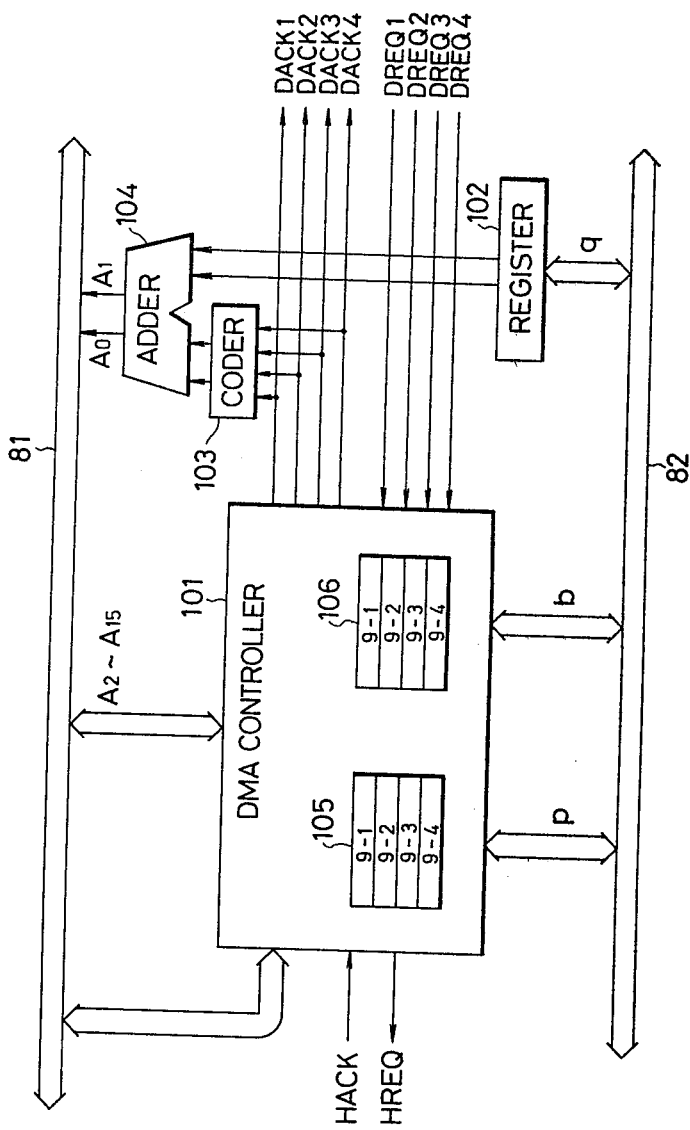
FIG. 3 illustrates a practical example of the constitution of a bus control circuit shown in FIG. 1.
Figure 4:
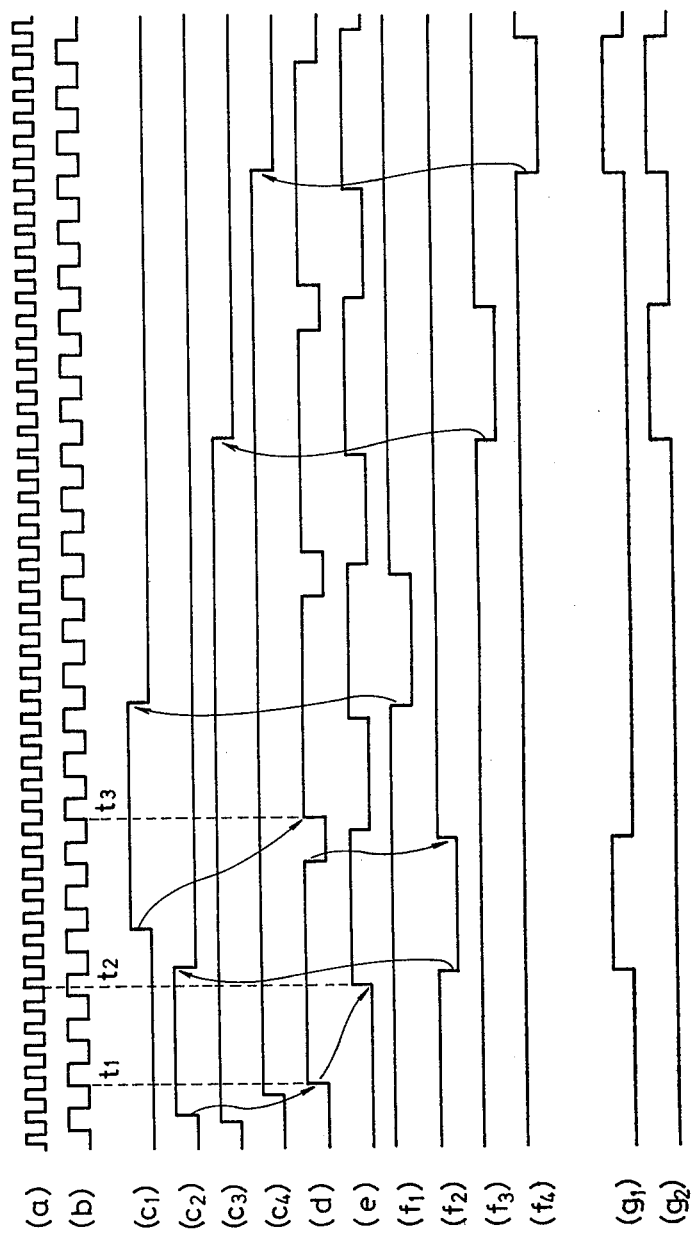
FIG. 4 is a timing chart showing the operation of the circuit shown in FIG. 3.

FIG. 3 illustrates a practical example of the bus control circuit to control the DMA data transmission between the main memory and the respective memory modules, particularly showing an example comprising four memory modules, while FIG. 4 is a timing chart showing the operation timing of the bus control circuit shown in FIG. 3.

In FIG. 3, a reference numeral 101 designates a DMA controller including an INTEL 8257, reference numeral 102 designates a register, reference numeral 103 designates a coder, reference numeral 104 designates a two-bit adder, reference numeral 81 designates an address bus, and reference numeral 82 designates a data bus. Moreover, the DMA controller 101 is provided with an address counter 105 to designate addresses in the main memory and a byte counter 106 to indicate the number of bytes in a data transmission.

In FIG. 4, reference symbol (a) designates the basic clock of the central processing unit 6, reference symbol (b) designates the clock of the DMA controller 101, reference symbols (c1) through (c4) designate DMA request signals DREQ1 through DREQ4 from the memory modules 9-1 through 9-n, respectively, reference symbol (d) designates a holding request signal HREQ to the central processing unit 6, reference symbol (e) designates a holding acknowledge signal HACK from the central processing unit 6, reference symbols (f1) through (f4) designate DMA transfer acknowledge signals DACK1 through DACK4 to the memory modules 9-1 through 9-4, respectively and reference symbols (g1), (g2) designate output signals A0, A1 of the two-bit adder 104, respectively.

The operation of the circuit shown in FIG. 3 will be described hereinunder with reference to the timing chart shown in FIG. 4.

For DMA data transmission between the memory modules 9-1 through 9-4 and the main memory 7, first, the central processing unit 6 determines a data transmission area in the main memory 7 and, when the top address is denoted by r, such quotients $p_0$ thru $p_3$ and residuals $q_0$ thru $q_3$ are obtained as found when addresses, r, r+1, r+2 and r+3 are divided by 4 respectively, i.e., $p_0$ through $p_3$ and $q_0$ through $q_3$ satisfying the relationships $r = 4p_0 + q_0$, $r+1 = 4p_1 + q_1$, $r+2 = 4p_2 + q_2$ and $r+3 = 4p_3 + q_3$, and transmitted to the bus control circuit 10 through the data bus 82. The bus control circuit 10 introduces $p_0$ through $p_3$ of the obtained values into the DMA controller 101 to set $p_0$, $p_1$, $p_2$ and $p_3$ at the positions in the address counter 105 corresponding to the memory modules 9-1, 9-2, 9-3 and 9-4, respectively, while $q_0$ is stored in the register 102. At the same time, the number of bytes b to be transferred are sent from the central processing unit 6 to the DMA controller 101 through the data bus 82, and the values are stored at the positions in the byte counter 106 corresponding to the respective memory modules. The addresses indicating these storage positions are transmitted through the address bus 81.

Next, following the instructions from the central processing unit 6, the memory modules 9-1 through 9-4 begin their operation and transmit respective DMA request signals DREQ1 through DREQ4 to the DMA controller 101 when becoming capable of transmitting data. The DMA controller 101 receives the DMA requests with a given timing $t_1$ and transmits the holding request signal HREQ to the central processing unit 6 when any one of the memory modules has a DMA request, in order to request the central processing unit 6 to be disconnected from the bus 8. According to the request, the central processing unit 6 disconnects itself from the bus 8 while it transmits a holding acknowledge signal HACK to the DMA controller 101. On the other hand, when there are DMA requests from a plurality of memory modules 9-2, 9-3 and 9-4, as shown in FIG. 4 (c1) through (c4), then until the timing $t_1$ that the DMA request is received, the DMA controller 101 previously selects one memory module 9-2 according to a given priority order and transmits the DMA acknowledge signal DACK2 to the selected memory module 9-2 when the holding acknowledge signal HACK is sent from the central processing unit 6 with a timing $t_2$, while it transmits the acknowledge signal to the coder 03, where the signal is converted into a two-bit signal, e.g., "01" and added to the two-bit adder 104. Because the two-bit data of the register 102 has been added to the two-bit adder 104, the addition of these values is performed in the two-bit adder 104, and the results are delivered as low order bit signals A0, A1 of the addresses in the main memory 7.

In addition, the DMA controller 101 reads out the contents of the address counter 105 corresponding to the memory modules to perform data transmission and transmits them as signals A2 through A15 representing the high order bits of the addresses in the memory 7 to the address bus 81. The signals A0 through A15 transmitted to the address bus 81 are sent to the main memory 7. The example mentioned above represents the case where each address in the main memory 7 is represented by a 16-bit code.

Thus, data transmission is performed between a desired memory module and the main memory according to the previously given memory address allocation. Upon completion of data transmission of 1 byte at the memory module 9-2, the holding request signal HREQ is terminated, and the disconnection of the central processing unit 6 from the bus 8 is removed. In addition, each of the portions of the address counter 105 and the byte counter 106 corresponding to the memory module 9-2 is counted up and down by 1, respectively.

Next, the DMA controller 101 receives DMA requests with a given timing $t_3$, selects a memory module of the highest priority and performs data transmission as mentioned above.

The preferred embodiment mentioned above uses DMA data transmission wherein data transmission is performed directly between the memory modules and the main memory. This is, however, hot exclusive and PIO (Programmed I/O) data transmission may be used wherein data transmission is performed with the central processing unit 6 interposed therebetween. In such a case, the bus control circuit 10 is omitted, and the program in the central processing unit 6 is substituted for the operation thereof.

As will be fully understood from the foregoing description, according to the present invention, it is possible to obtain an inexpensive magnetic bubble memory device capable of flexibly coping with the demand for various data transmission speeds of application systems by operating in parallel the memory modules each incorporating the controller and the clock generator.

What is claimed is:

1. A magnetic bubble memory device comprising:
a plurality of memory modules coupled over a shared communication link to a main memory, each of said memory modules including
at least one magnetic bubble chip,
first means for generating a respective clock signal that establishes the data transmission speed for data transmission relative to that module,
second means, coupled to said first means, for generating timing signals in accordance with the clock signal generated by said first means, and
third means for driving said at least one magnetic bubble chip in response to said timing signals generated by said second means;
said main memory having successive addresses which are allocated to the respective memory modules of said plurality of memory modules on a sequential cyclical bases; and
control means for controlling a data transmission between a prescribed one of said memory modules and the addresses in said main memory that are successively allocated to said one module; and wherein
the clock signals for at least two of said memory modules differ from one another.

2. A magnetic bubble memory device according to claim 1, wherein the clock signals generated by the respective memory modules are respectively different from one another.

3. A magnetic bubble memory device according to claim 2, wherein said control means is provided with means adapted to receive a data transmission request from any one of said memory modules and to perform a direct memory access data transmission between the memory module whose request has been received and said main memory.

4. A magnetic bubble memory device according to claim 2, wherein successive address locations of said main memory and allocated to said memory modules on a multi-address grouping basis.

5. A magnetic bubble memory device according to claim 2, wherein each of said memory modules further includes a controller adapted to control data transmission between said main memory and said magnetic bubble chip.

6. A magnetic bubble memory device comprising
a plurality of memory modules each having
at least one magnetic bubble chip,
clock generator means for generating a respective clock signal,
timing generator means for generating timing signals in response to the clock signal generated by said clock generator means, and
driving means for driving its associated at least one magnetic bubble chip in response to said timing signals, so that said each memory module is adapted to operate asynchronously with respect to the other memory modules of said plurality of memory modules;
a main memory successive addresses which are cyclically allocated to the respective memory modules; and
control means for effecting data transmission between a prescribed one of the memory modules and successive addresses in said main memory that are allocated to said memory module.

7. A magnetic bubble memory device as defined in claim 6, wherein said control means is provided with means adapted to receive a data transmission request from any one of said memory modules and to perform a direct memory access data transmission between the memory module whose request has been received and said main memory.

8. A magnetic bubble memory device as defined in claim 6 or 7, wherein address locations in said main memory are allocated to the respective memory modules on a word-by-word basis.

9. A magnetic bubble memory device as defined in claim 6 or 7, wherein address locations in said main memory are allocated to each of said memory modules in the unit of a capacity equal to one block.

10. A magnetic bubble memory device as defined in claim 6 or 7, wherein address locations in said memory modules further includes a controller adapted to control data transmission between said main memory and said magnetic bubble chip.

* * * * *